United States Patent [19]

Iuchi

[11] Patent Number: 4,957,149
[45] Date of Patent: Sep. 18, 1990

[54] PNEUMATIC TIRE TREAD WITH PLURAL OVERLAPPING NARROW GROOVES IN SHOULDER

[75] Inventor: Munenori Iuchi, Kobe, Japan

[73] Assignee: Sumitomo Rubber Industries, Ltd., Japan

[21] Appl. No.: 304,194

[22] Filed: Jan. 31, 1989

[30] Foreign Application Priority Data

Feb. 1, 1988 [JP] Japan .................................. 63-22447

[51] Int. Cl.$^5$ .............................................. B60C 11/06
[52] U.S. Cl. ........................... 152/209 R; 152/DIG. 3
[58] Field of Search .......... 152/209 R, 209 D, 209 A, 152/DIG. 3, 523

[56] References Cited

U.S. PATENT DOCUMENTS

| | | | |
|---|---|---|---|
| 3,605,847 | 9/1971 | Gough | 152/209 R |
| 4,736,783 | 4/1988 | Motomura et al. | 152/209 R |
| 4,836,257 | 6/1989 | Mamada et al. | 152/209 R |

FOREIGN PATENT DOCUMENTS 160541 11/1985 European Pat. Off. ...... 152/DIG. 3

Primary Examiner—Michael W. Ball
Assistant Examiner—Geoffrey L. Knable

[57] ABSTRACT

A pneumatic tire has a tread region and a pair of shoulder regions, one extended radially inwardly from each tread edge, and the tread region is provided with a pair of circumferentially extending shoulder ribs, and the shoulder regions are provided with buttress hollows arranged circumferentially at intervals, wherein at least one of the shoulder ribs is provided with circumferentially extending narrow grooves, which narrow grooves are arranged in the circumferential direction of the tire so that the circumferentially adjacent narrow grooves overlap with each other at their end portions, and the locations of the overlaps in the narrow grooves are coincident with the locations of the buttress hollows in the circumferential direction of the tire.

7 Claims, 2 Drawing Sheets

PNEUMATIC TIRE TREAD WITH PLURAL OVERLAPPING NARROW GROOVES IN SHOULDER

BACKGROUND OF THE INVENTION

The present invention relates to a pneumatic tire suitable for heavy duty vehicles e.g. truck and bus, and more particularly, a tread pattern provided with shoulder ribss such as rib patterns, rib-block patterns and the like which can alleviate uneven wear.

In general, pneumatic tires having a carcass can be classfied into two types from the view point of carcass construction, that is, bias tires and radial tires. As to tread patterns, there are many types such as the rib type, the lug type, the block type, the rib-block type, the rib-lug type, the lug-block type and the like. And such carcass types and tread pattern types are combined in accordance with the use for the tire.

For example, in heavy duty radial tires for trucks and buses which run on paved roads, often used are rib type patterns formed by circumferentially extending ribs and rib-block type patterns formed by a pair of shoulder ribs extending circumferentially one at each tread edge portion and blocks in the crown region between the shoulder ribs.

However, tires having such types of tread patterns, tend to wear more rapidly in the tread shoulders than the tread crown. This kind of uneven wear is called shoulder wear, which wear is formed in such a way that the axially outermost edge of the shoulder rib wears partially due to cornering and so on, and the partial wear grows and extends unevenly in the circumferential direction and axial direction of the tire due to the difference in diameter between the tread crown and the tread shoulders. Also the slip during cornering, and consequently the amount of wear of the shoulder rib becomes larger than that of the tread element therebetween such as a rib and a block.

In order to prevent shoulder wear, as shown in FIG. 5, it has been proposed to form a circumferentially continuously extending straight narrow groove G on each shoulder rib SR. This narrow groove is effective to a certain extent for preventing the partial wear from growing axially inwardly of the tire. However, the axially outside part OR of the shoulder rib divided by the narrow groove G operates as an isolated narrow rib, and because of its narrow width, this outside part is moved easily to accelerated the growth of the wear.

On the other hand, in order to improve traction performance, wandering performance and the heat radiation power of tire, the tire is generally provided in each of its shoulder regions or tire shoulders with a buttress portion BA by forming buttress hollows H, the radially outer ends of which are opened at the tread surface T at intervals in the circumferential direction of the tire, as marked in FIG. 5 by chain lines.

When such buttress hollows are formed on the abovementioned tire which is provided on each shoulder rib SR with the circumferentially continuously extending straight narrow groove G, the shoulder rib is decreased in rigidity at the hollowed portions IH between buttress hollows H and narrow groove G, and those portions IH is moved largely during running and, as a result, they become nucleuses of partial wear. Thus there exist a problem that the shoulder wear is induced as explained above.

It is, therefore, an object of the present invention to provide a pneumatic tire, which is provided with buttress hollows and narrow grooves on tread shoulder ribs for preventing the axially inward growth of partial wear, and in which the shoulder ribs are uniform in rigidity to lessen the partial movement thereof and to alleviate shoulder wear.

SUMMARY OF THE INVENTION

According to one aspect of the present invention, a pneumatic tire has a tread region and a pair of shoulder regions, one extended radially inwardly from each tread edge, and the tread region is provided with a pair of circumferentially extending shoulder ribs, and the shoulder regions are provided with buttress hollows arranged circumferentially at intervals, wherein one of the shoulder ribs is provided with a plurality of circumferentially extending narrow grooves, which narrow grooves are arranged in the circumferential direction of the tire so that the circumferentially adjacent narrow grooves overlap with each other at their end portions, and the locations of the overlaps in the narrow grooves are coincident with the locations of the buttress hollows in the circumferential direction of the tire.

BRIEF DESCRIPTION OF THE DRAWINGS

Embodiments of the invention will now be described in detail by way of example in conjuction with the accompanying drawing, in which.

DETAILED DESCRIPTION OF THE INVENTION

Figure 1:
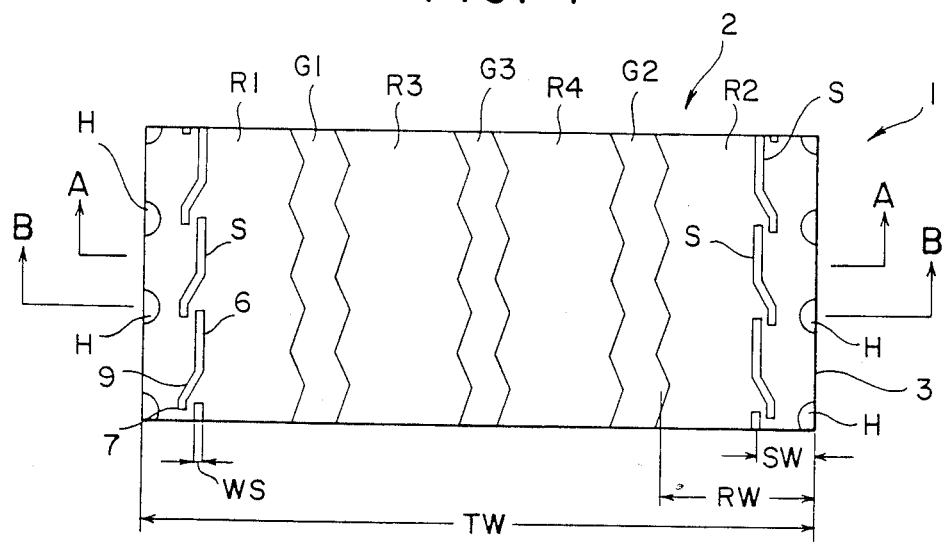
FIG. 1 is a partial plan view of a tread showing an embodiment of the present invention.

In the drawings, the pneumatic tire 1 has a tread region 2 and a pair of shoulder regions, one extended radially inwardly from each tread edge 3, and the tire is provided in the tread region with a pair of shoulder ribs R1 and R2 and further provided in each of the shoulder regions with buttress hollows H arranged circumferentialy at regular or irregular intervals, wherein the shoulder ribs are located immediately inside the tread edges respectively, that is, the axially outer edge of each shoulder rib defines the tread edge, and the redially outer of the buttress hollows are opened at the tread surface at intervals in the circumferential direction of the tire, and each shoulder rib is provided with a plurality of narrow grooves S.

The tread region is provided with at least one main groove extending circumferentially of the tire in a zigzag, wavy or straight configuration to define the abovementioned shoulder ribs.

The narrow grooves extend circumferentially of the tire, and each groove comprises a long main portion 6, a short overlap portion 7 and an inclined portion 9 extending therebetween.

The main portion and the overlap portion extend in parallel to the circumferential direction of the tire and they are shifted in the axial direction of the tire. The inclined portion is inclined with respect to the circumferential direction of the tire and connects the overlap portion with the main portion.

Accordingly, the narrow grooves have generally a crank shaped form at the tread surface.

On each shoulder rib, the narrow grooves S are arranged circumferentialy of the tire in the form of a substantially straight line, and the circumferentially adjacent narrow grooves overlap each other at their end portions in such a manner that the overlapping portion 7 of each narrow groove overlap with the end part of the main portion 6 of the next narrow groove. And further, these overlapping portions are made axially inside the buttress hollows and, in the circumferential direction of the tire, the locations of the overlapping portions coincide with those of the buttress hollows.

The width Ws of the narrow groove S is set to be less than 5 mm in width, and a substantially zero-width is preferable for further reduction in the axially inward growth of partial wear because the opposed groove walls contact and support each other to prevent excessive movement of the shoulder rib. Incidentally, such a narrow groove having a substantially zero-width can be formed by cutting the tread region of a vulcanized tire or a vulvanized tread rubber with a knife blade.

The depth DS of narrow groove S is more than 30 % of the depth DG of main groove G which defines the shoulder rib on which the same narrow groove is formed.

The distance SW of the narrow groove S from the tread edge 3 is 5 to 20% of the tread width TW and is preferably less than 50% of the width RW of the shoulder rib.

Figure 2:
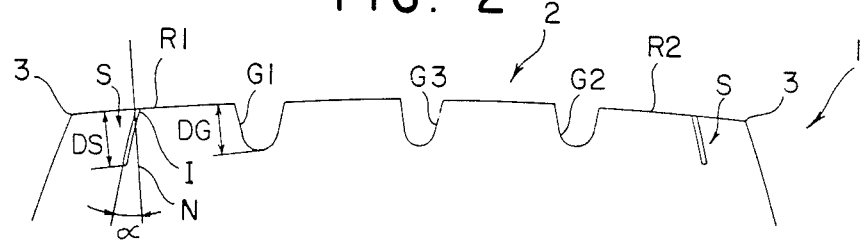
FIG. 2 is a sectional view taken along a line A—A thereof.

Further, in a cross section including the tire axis, the narrow groove S is inclined axially outwardly with respect to a normal line N drawn from the intersecting point I of the narrow groove S with the tread surface at an small angle (alfa) of less than 20 degrees, as shown in FIG. 2. The narrow groove S may be inclined reversely, that is, axially inwardly.

The narrow grooves can reduce the axial rigidity of the shoulder rib because they are extended circumferential of the tire, which can lessen the slip between the shoulder rib and the road during cornering of the vehicle, which is a main cause of partial wear as a nucleus of shoulder wear. As a result, the partial wear is effectively prevented.

Furthermore, the narrow grooves can decrease the difference in ground contact pressure between axially inner and outer portions of the shoulder rib, which can alleviate the wear caused by the difference in diameter.

Still furthermore, because the narrow grooves overlap at positionss near and axially inside the buttress hollows, the axialy outer part and inner part of the shoulder rib with respect to the row of the narrow grooves is connected to each other at the overlapped portions, that is, the hollowed portions. Accordingly, excessive movement of the outer part, especially at the hollowed portions, is effectively prevented. As the result, the generation of partial wear itself is reduced.

Figure 3:
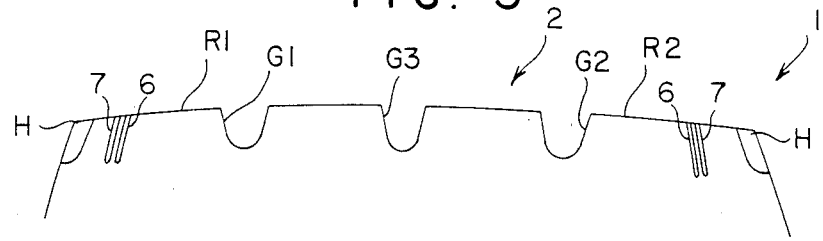
FIG. 3 is a sectional view taken along a line B—B thereof.

In the embodiment shown in FIGS. 1 to 3, the tire 1 has a rib type tread pattern, and in this example the tread region 2 is provided with three main grooves G1, G2 and G3. The main grooves G1, G2 and G3 are extended circumferentially of the tire in parallel with each other in a zip-zag configuration. Accordingly, the tread is divided into four ribs R1, R2, R3 and R4 including a pair of shoulder ribs R1 and R2 and two zigzag ribs therebetween. The narrow grooves S on each shoulder rib are arranged so that their main portions 6 line uo in a straignht line, and in each overlap the overlap portion 7 is located axially outward fo the main portion 6.

Figure 4:
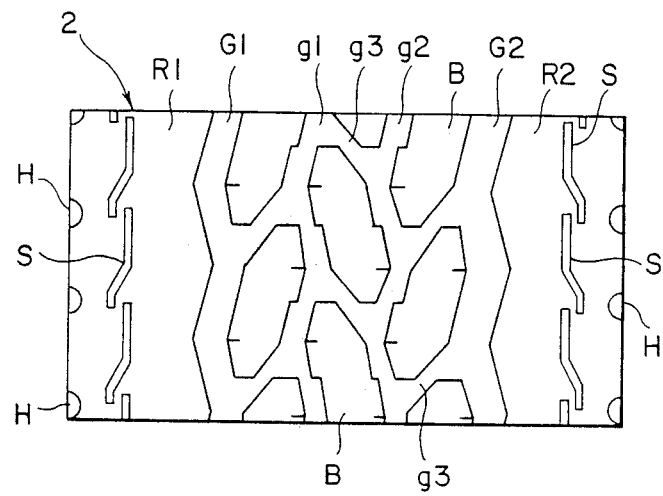
FIG. 4 is a partial plan view of a tread showing another embodiment of the present invention.
Figure 5:
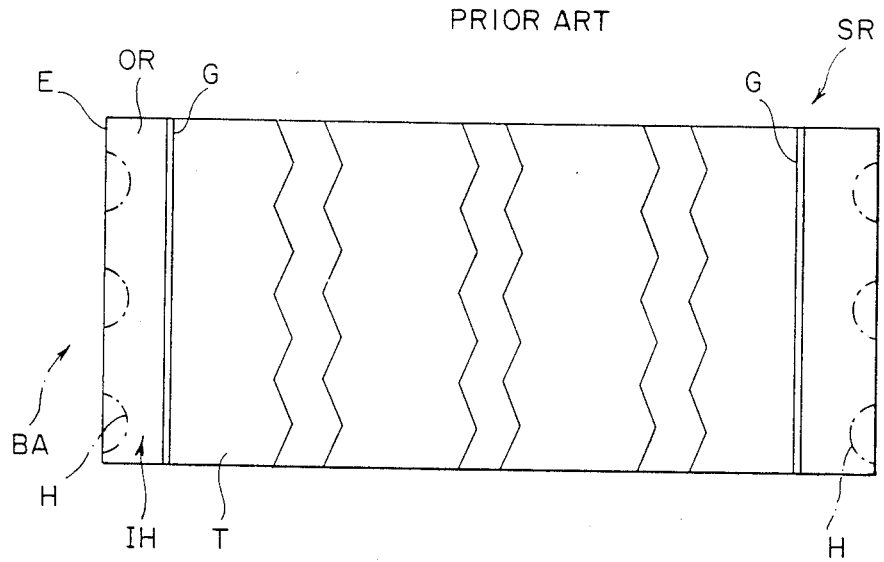
FIG. 5 is a partial plan view of a tread showing the prior art.

In another embodiment shown in FIG. 4, the tire 1 has a rib-block tread pattern, and in this embodiment the tread region 2 is provided with a pair of main grooves G1 and G2 which define the shoulder ribs R1 and R2 respectively. Further, the tread region 2 is provided between the main grooves with circumferentially extending two grooves g1 and g2 and axially extending grooves g3 to define three rows of blocks B between the two shoulder ribs.

Furthermore, as another embodiment of the present invention, the narrow grooves S can be formed on one of the shoulder ribs only. In general, the shoulder wear is conspicuos at the shoulder rib placed on the outer side of the vehicles. Accordingly, the tire of this embodiment should be mounted on a vehicle so that the shoulder rib which is provided with the narrow grooves becomes placed on the outer side of the vehicle.

Still furthermore, in the case of the wide shoulder rib, the narrow grooves S can be arranged in plural rows in the axial direction of the tire, and further, a sipe which is extended circumferentially, continuously at the axially inside of the narrow grooves can be used in combination with the narrow grooves.

In the above-mentioned embodiments, each tire 1 is a radial tire for heavy duty vehicles such as a truck and bus, which comprises a pair of beads with a core, a radial carcass reinforced with steel or fiber cord ply turned up at each edge portion around the bead cores, a tread disposed radially outside the carcass, a pair of sidewalls, a belt composed of a plurality of steel cord plies disposed between the carcass crown and the tread, and bead reinforcing layers composed of steel cords and/or organic fiber cords. The present invention, however, can be applied to light truck tires, passenger car tires and the like in addition to the heavy duty tires, and also applied to bias tires.

As explained above, in the present invention, a plurality of circumferentially extending narrow grooves are arranged on the shoulder rib in such a way that the circumferential adjacent narrow grooves overlap with each other at positions coincident with those of the buttress hollows in the circumferential direction of the tire. Accordingly, the rigidity of the hollowed portions is increased to control their movement during running, and the occurence of partial wear and it's growth are both reduced. As a result, the shoulder wear is effectively prevented.

The invention being thus descrbed, it will be obvious that the same may be varied in many ways. Such variations are not to be regarded as a departure from the spirit and scope of the invention, and all such modifications as would be obvious to one skilled in the art are intended to be included within the scope of the following claim.

I claim:

1. A pneumatic tire having a tread region and a pair of shoulder regions, one extended radially inwardly from each tread edge, said tread region provides with a pair of circumferentially extending shoulder ribs, said shoulder regions being provided with buttress hollows arranged circumferentially at intervals, one of said shoulder ribs being provided with a plurality of circumferentially extending narrow grooves, said narrow grooves arranged in the circumferetial direction of the tire so that the circumferentially adjacent narrow grooves are overlapped with each other at their end portions, the locations of the overlaps in said narrow grooves being coincident with the locations of the buttress hollows in the circumferential direction of the tire, each of said narrow grooves comprising a long main portion, a short overlap portion and an inclined portion extending therebetween to connect the overlap portion with the main portion, and said main portion and said overlap portion extending in parallel to ghe circumferential direction of the tire, and said inclined portion being inclined with respect to the circumferential direction of the tire and connecting said overlap portion with said main portion.

2. The tire according to claim 1, wherein the width of said narrow groove is less than 5 mm.

3. The tire according to claim 2, wherein said narrow groove has a substantially zero-width so that the opposed groove walls contact with each other.

4. The tire according to claim 1, wherein the depth of the narrow groove is more than 30% of the depth of a circumferential groove which defines the shoulder rib on which the same narrow groove is formed.

5. The tire according to claim 1, wherein the distance of the narrow grooves from the tread edge is 5 to 20% of the tread width.

6. The tire according to claim 5, wherein said distance is less than 50% of the width of the shoulder rib.

7. The tire according to claim 1, wherein, in a cross section including the tire axis, said narrow grooves are inclined axially outwardly with respect to a normal line drawn froma intersecting point of the narrow groove with the tread surface at an angle of less than 20 degrees.

* * * * *